INVENTOR.
B. W. Gustafson
Attorneys

Sept. 18, 1956  B. W. GUSTAFSON  2,763,118
FORAGE HARVESTER ATTACHMENT
Filed Sept. 3, 1953  3 Sheets-Sheet 2

INVENTOR.
B. W. Gustafson
BY
Attorneys

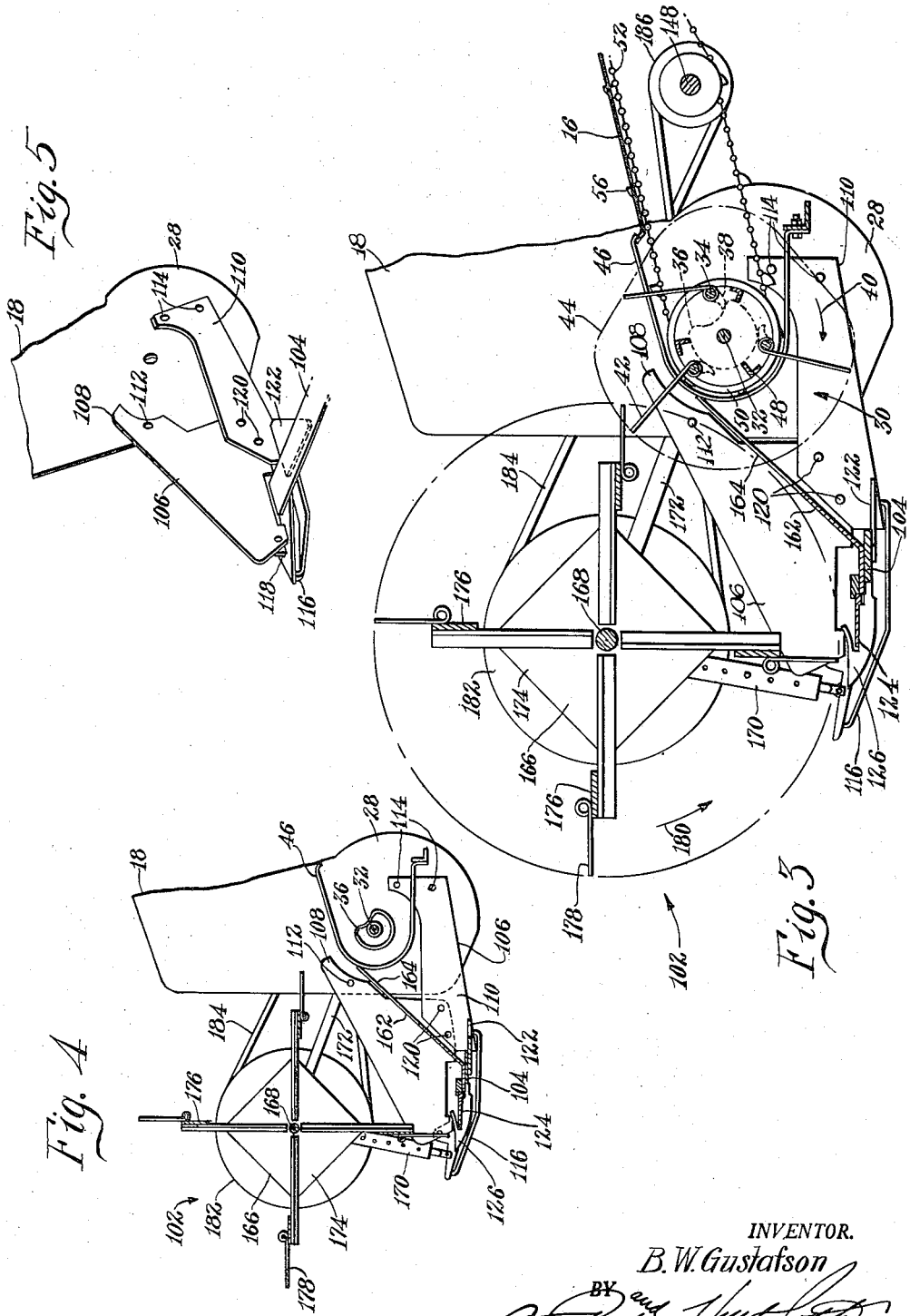

United States Patent Office 2,763,118
Patented Sept. 18, 1956

2,763,118

FORAGE HARVESTER ATTACHMENT

Blaine W. Gustafson, Ottumwa, Iowa, assignor to Deere Manufacturing Co., Dubuque, Iowa, a corporation of Iowa Application September 3, 1953, Serial No. 378,283

7 Claims. (Cl. 56—158)

This invention relates generally to a harvester and more particularly to an attachment for a harvesting machine so as to increase the versatility of the machine.

It is not unusual for a manufacturer to furnish a machine, loosely referred to as a forage harvester, designed to cut and reduce for silage various kinds of crops including the grasses as well as the heavier stalk type such as corn. Since it is virtually impossible for the same machine to handle all varieties of crops, the machine is furnished as a basic machine to which several attachments may be secured. The basic machine would ordinarily comprise a mobile frame having feed means and chopping means thereon, crops being delivered to the latter for discharge through a conventional spout to a trailing wagon or other vehicle. Depending upon the type of crop to be harvested, the machine has an attachment for cutting and gathering the crops so that the crops are fed by the feeding means to the chopping means. These attachments take the form, variously, of row-crop attachments for handling corn and the like, sickle bar attachments for cutting grasses, and pickup means for picking up crops previously harvested. Although these attachments are interchangeable, they cannot, of course, be used simultaneously and the conversion of the machine from one type to another requires, in some cases, a considerable expenditure of time and labor.

According to the present invention, the conversion task is made easier by the provision of a simple and inexpensive sickle bar attachment that may be used with a forage harvester of the pickup type. That is to say, the basic machine, as converted, will include pickup means for gathering previously harvested crops. In order to convert such machine to a harvester having a cutter bar, it is merely necessary, according to the present invention, to mount the sickle bar ahead of the pickup means, whereby the machine becomes a grass harvester and the pickup means and associated conveyor are utilized as conveying means for feeding the cut crops to the basic chopping means. The design in this respect differs fundamentally from conversion of the typical forage harvester to a cutter bar type of harvester in that, according to the present invention, more of the basic machine is used and the attachment is relatively simple in itself and is easy to mount.

A further feature of the invention resides in a unitary or self-contained attachment having a cutter bar and shield means associated with the cutter bar, this attachment being positionable immediately ahead of the pickup means so that crops cut by the cutter bar are moved directly rearwardly to the pickup means, whereby the pickup means serves as a conveyor for transferring the cut crops to the conveying means of the basic machine. A still further feature resides in the inclusion in the attachment of support means for mounting a reel that cooperates with the cutter bar. Since most machines are equipped with pickup means of the rotary drum type having projecting fingers, the shield means of the attachment is slotted so as to permit the pickup fingers to project therethrough. Still further, the reel has radially projecting fingers that cooperate with the shield in moving the crops upwardly and rearwardly to be conveyed by the pickup fingers to the basic conveyor. A still further feature of the invention resides in the timing or relative speeds of rotation of the reel and pickup means so that the peripheral speed of the reel is somewhat slower than that of the pickup means, thereby accomplishing a stripping of the pickup fingers by the reel fingers and vice-versa.

Various other features and advantages of the invention will occur to those versed in the art as a preferred embodiment of the invention is disclosed in detail in the following specification and accompanying sheets of drawings in which:

Fig. 3 is a fragmentary sectional view, on an enlarged scale, as seen substantially along the line 3—3 of Fig. 2.

Fig. 4 is a fragmentary sectional view, on the scale of Figs. 1 and 2, as seen along the line 4—4 of Fig. 2.

Fig. 5 is a fragmentary perspective view on a scale approximately that of Figs. 1, 2 and 4 and illustrating the attachment means at one end of the cutter bar.

Figure 1:
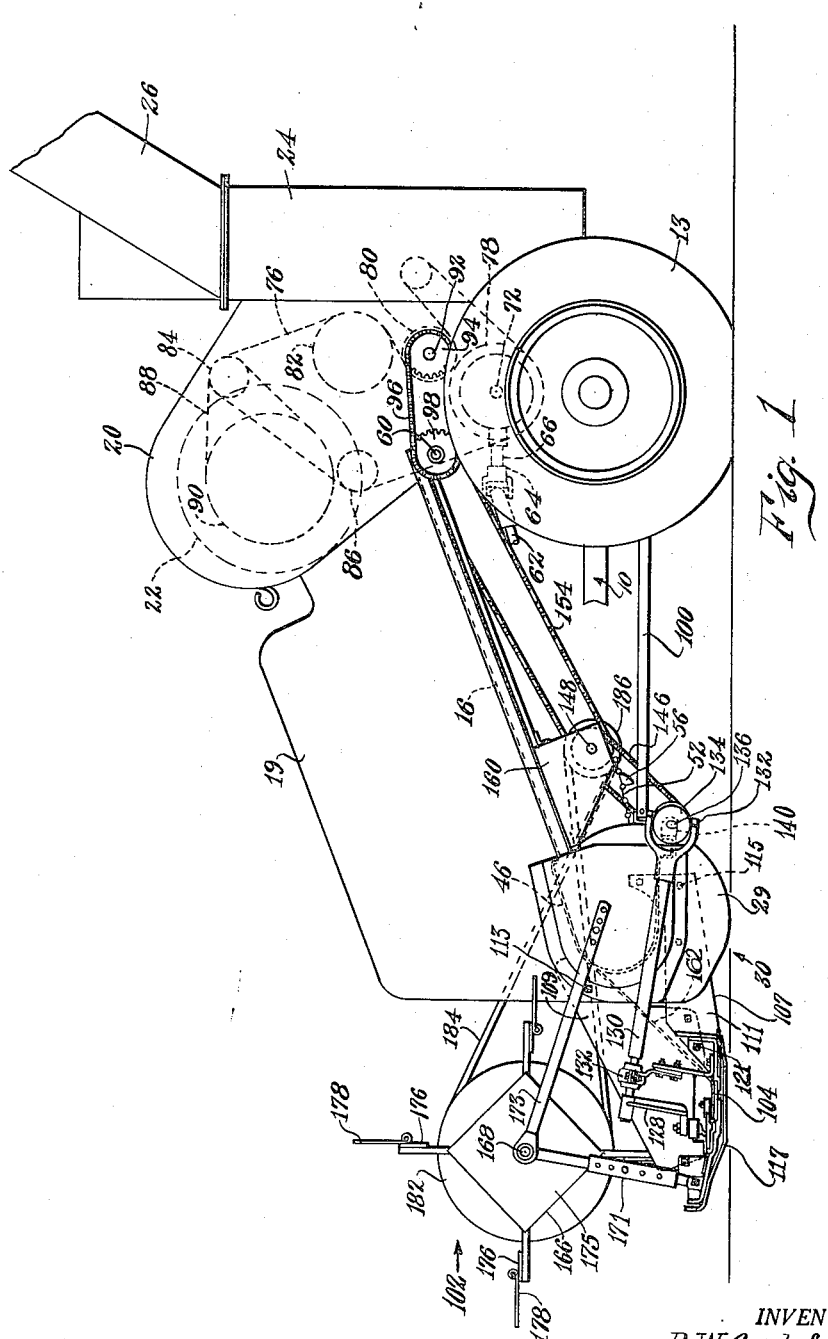
Fig. 1 is a side elevational view of a forage harvester equipped with the improved attachment, a portion of the draft structure being omitted in the interests of clarity.

The basic harvester chosen for purposes of illustration here is merely representative of many types of machines and accordingly its structure may vary widely without affecting the invention, it being only necessary, of course, to modify some of the attaching parts to enable attachments based on the invention to fit machines of somewhat different types. The machine shown comprises a mobile main frame 10 carried on transversely spaced right- and left-hand wheels 12 and 13 and including a forwardly extending draft tongue 14 by means of which the machine may be connected to a tractor (not shown) for advance over a field. The harvester is fundamentally a pickup type having a forwardly extending conveyor deck 16 including right- and left-hand forwardly diverging side shields 18 and 19, the deck being thus wider at its forward than at its rearward end. Its rearward end leads into a housing 20 in which is enclosed suitable feed mechanism, represented here primarily by a feed drum or roll 22 (Fig. 1). Crops conveyed upwardly over the conveyor deck 16 are received within the housing 20 and are advanced from there into a conventional rotor housing 24 for reduction and ultimate discharge through a rearwardly and upwardly extending discharge spout 26. These details, as well as others inherent in the basic machine, are relatively unimportant and, as mentioned above, may be varied widely. A representative basic or background machine is shown, for example, in the U. S. patent to Hill 2,493,918.

Figure 2:
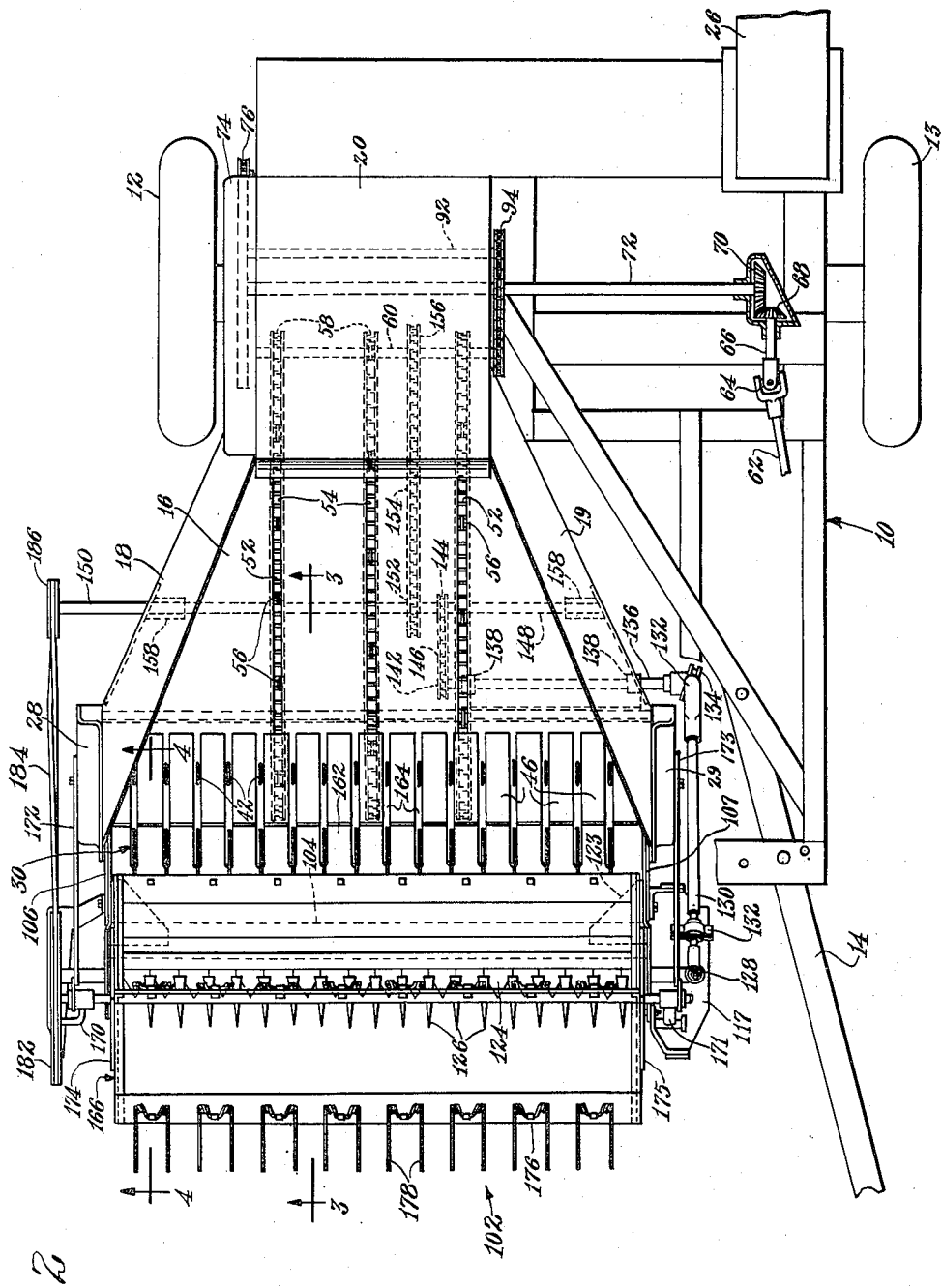
Fig. 2 is a plan view of the same.

The forward terminal ends of the side sheets 18 and 19 of the conveyor deck 16 merge into opposite end or side members 28 and 29 of pickup means designated generally by the numeral 30. The pickup means is of the rotary drum type comprising a fixed central shaft 32, three circumferentially spaced oscillating shafts 34 and a fixed control cam 36 followed by followers 38 respectively on the oscillating shafts 34. This construction is not unconventional, and it will be readily understood by those versed in the art that the pickup means rotates in the direction of the arrow 40 (Fig. 3) to cause a plurality of pickup teeth or fingers 42 to travel in a closed path or orbit 44 that is non-circular because of the shape of the cam 36. In other words, the fingers 42, which are secured to the oscillating shafts 34, have a feathering action and are extended in the downward and forward portions of their orbit and retract in the upper and rear portions of the orbit, thereby serving to pick up cut crops from the ground (ordinarily) and to deliver such crops upwardly and rearwardly to the conveyor deck 16. A plurality of U-shaped strips 46 form a slotted structure through which the fingers pass as they travel through their orbits. In the particular pickup means shown, the drum structure in which the oscillating shafts 34 are carried includes a plurality of circumferentially spaced angle bars 48 encircled by three axially spaced sheaves 50. Conveyor means in the form of a plurality of endless chains 52 cooperate with the conveyor deck 16 to facilitate the transfer of crops from the pickup means 30 to the feed housing 20. The chains 52 are trained respectively about the sheaves 50 and the pickup deck 16 is slotted at 54 to accommodate lugs 56 fixed on the chains 52. The upper ends of the chains are trained about sprockets 58 keyed to a transverse driving shaft 60 just below the feed drum 22 (Figs. 1 and 2).

The basic harvester includes driving mechanism comprising an input or propeller shaft 62 adapted to be connected at its forward end to the power take-off shaft of a tractor (neither of which is shown) as is conventional. The propeller shaft drives, through a universal joint 64, a stub shaft 66 that is geared at 68—70 to a transverse power shaft 72. This shaft extends completely across the machine and drives various rotating parts of the machine. These parts are normally covered by a shield 74 and are not illustrated here, because they are conventional and without particular significance, except so far as the shaft 72 provides a source of power for the harvester attachment, as will presently appear. However, for the sake of illustration, a driving chain 76 is shown in dotted lines in Fig. 1 as being trained about a plurality of sprockets 78 (on the right-hand end of the shaft 72), 80, 82, 84 and 86. A second chain 88 establishes drive from the sprocket 84 to a sprocket 90 on the feed drum 22.

The sprocket 80 is keyed to a transverse shaft 92 and this shaft has keyed to its left-hand end a sprocket 94. A driving chain 96 connects this sprocket and a sprocket 98 keyed to the left-hand end of the shaft 60, previously described as carrying the sprockets 58 for the conveyor chains 52. By this means, the conveyor chains 52 as well as the pickup means 30 are driven from the propeller shaft 62.

The pickup means 30 is braced to the main frame 10 by a pair of braces 100, only one of which appears in the drawings.

To the extent described, the machine will operate as a conventional pickup harvester for gathering crops that have been previously cut and left lying in the field in windrows. The pickup means 30 picks up these crops from the ground, transfers them to the conveyor deck 16 and the conveyor chains 52 transfer the crops to the feed housing 20, whence the crops are fed to the reducing or rotor housing 24. It will be seen that a pickup machine of the type just referred to has certain limitations; that is, it is limited to use in a field in which crops have been previously cut. Conventionally, however, a cutter bar type harvester can be had by converting the basic machine, which usually involves removing the entire pickup means and conveyor deck and substituting therefor a cutter bar and new conveying means. Likewise, the machine may be converted to a row-crop harvester by removing the pickup means and conveyor deck and substituting a row-crop attachment therefor. A representative machine with a cutter bar attachment thereon is shown in the U. S. patent to Tuft 2,507,742. A representative row-crop attachment appears in the U. S. patent to Tuft 2,518,732. In both of these cases, the machine has been modified or converted from about the feed house forward, thus necessitating the purchase of rather expensive conversion parts and the removal of about the same amount of parts that cannot be used with the conversion parts. According to the present invention, the conversion to a cutter harvester is made relatively simply and inexpensively by utilizing all of the original parts of the pickup means and conveyor deck.

The harvesting or sickle bar attachment is designated generally by the numeral 102 and includes, among other things, a cutting mechanism support in the form of a transverse cutter bar 104 having mounting means 106 and 107 respectively at its right- and left-hand ends for attaching the cutter bar to the basic machine so that the cutter bar lies immediately ahead of and parallel to the pickup means 30. The attaching means 106 is in the form of a bifurcated element having upper and lower portions 108 and 110, both of which extend rearwardly and are removably secured, as by bolts 112 and 114, to the inner face of the right-hand side member 28 of the pickup means 30. The cutter bar 104 has a right-hand shoe 116 to which is affixed an upstanding flange 118. This flange serves as means for mounting the upper part 108 of the attaching means 106. The lower part 110 of the attaching means is secured by bolts 120 to the upper part 108 and in addition is welded to a gusset plate 122 which is in turn welded to the right-hand end portion of the cutter bar 104.

Corresponding but symmetrical parts are included in the left-hand attaching means 107 and, to the extent visible, bear odd reference characters related to the even reference characters used at the right-hand end of the machine. Thus, parts 109, 111, 113 and 115 are visible in Fig. 1. A right-hand gusset plate 123 is visible in Fig. 2. The lower part 111 of the attaching means 107 is rigidly fixed to a right-hand shoe 117 for the sickle or cutter bar 104.

The bifurcated nature of the attaching means 106 and 107 is such that these attaching means accommodate the end-most U-shaped members 46 that embrace the pickup mechanism. Therefore, the attachment may be readily mounted on and dismounted from the basic machine without disturbing the pickup mechanism in any respect. In the preferred embodiment illustrated, only the three bolts 112 and 114 at the right side of the machine and three similar bolts 113 and 115 at the left-hand side of the machine are used in mounting the cutter bar 104 on the machine for cooperation with the pickup mechanism in a manner to be presently described.

The attachment 102 includes cutting mechanism, here a sickle or knife 124 of somewhat conventional construction. This sickle is reciprocated and cooperates with guards 126 in the usual fashion to cut standing crops as the machine is advanced. The sickle is reciprocated by driving mechanism including a crank arm 128 keyed to the forward end of an oscillating shaft 130 journaled in a bearing 132 carried by the left-hand shoe 117. The rear end of the shaft 130 is in the form of a yoke 132 cooperative with a wobble member 134 keyed to a transverse shaft 136. Any other form of drive could be used. That shown is merely representative and is similar to that disclosed in the U. S. patent to Paradise 2,297,317.

The drive mechanism illustrated, including the shaft 136, is preferably furnished as part of the attachment 102. The shaft may be readily carried on the machine, such as by suitable bearings 138 mounted on the rear portions of the pickup means 30 as by brackets 140, only one of which appears in Fig. 1. The right-hand end of the shaft 136 has keyed thereto a driving sprocket 142 about which and a companion sprocket 144 a short driving chain 146 is trained. The sprocket 144 is keyed to a transverse shaft 148 that is conventionally used to carry idlers (not shown) for guiding the lower runs of the conveyor chains 52. In the present case, the shaft 148 may have a right-hand extension 150 for purposes to presently appear; or, the original shaft may be removed and replaced by a longer shaft to accomplish the necessary result. The shaft 148 has fixed thereto a driven sprocket 152 which is driven by a chain 154 from a driving sprocket 156 that is keyed to the transverse shaft 60, previously described as supporting the sprockets 58 for the conveyor chains 52. The shaft 148 is suitably journaled in bearings 158 supported in brackets of which that shown at 160 in Fig. 1 is typical.

Another feature of the attachment 102 is the means for causing harvested crops to move directly to the pickup means rather than falling on the ground. This means in the preferred embodiment of the invention shown takes the form of a plate or shield element 162. The lower marginal edge of this shield or plate is secured to the cutter bar 104 and it extends upwardly and rearwardly to approximately the level of the conveyor means or deck 16. The shield 162 is provided with a plurality of fore-and-aft extending, transversely spaced apart slots 164, and these slots allow the pickup fingers 42 to pass therethrough as they travel through their orbits, it being understood, of course, that the pickup fingers are transversely spaced and their orbits lie respectively in fore-and-aft extending planes.

A still further part of the attachment 102 comprises a rotating reel designated generally by the numeral 166 and including a central transverse shaft 168 that is suitably journaled at its opposite ends by upright supports 170 and 171. Each of these supports is fixed at its lower end to the proximate end portion of the cutter bar 104 and is preferably vertically adjustable to vary the position of the reel relative to the cutter bar. In addition, the reel shaft 168 is braced at its opposite ends from the side sheets 18 and 19 of the harvester by appropriate braces 172 and 173. The attachment of the braces to the basic machine preferably includes provision for fore-and-aft adjustment.

The reel may be of conventional construction and to that extent comprises opposite end spiders 174 and 175 between which are carried typical reel bats 176. Each of these bats has fixed thereto a plurality of crop-engaging fingers or spring teeth 178, and these teeth are spaced apart transversely and lie in fore-and-aft extending planes staggered transversely relative to the planes of the orbits of the pickup fingers 42, so that the reel and pickup fingers do not conflict in the zone in which they overlap adjacent to the shield means 162. The reel rotates in the direction of the arrow 180 and as the teeth sweep rearwardly over the cutter bar, they move the crops up the shield and into the zone of travel of the pickup teeth 42. The crops are thus transferred from the reel to the pickup teeth and thence to the deck 16 to be carried upwardly to the feeder house 20 by the conveyor chains 52. Hence, not only does the reel cooperate with the cutter bar but it functions in relation to the shield means 162 as well as in relation to the pickup teeth 42.

The right-hand end of the reel assembly has fixed to the reel shaft 168 a relatively large sheave 182 driven by a belt 184 from a somewhat smaller sheave 186 keyed to the right-hand shaft extension 150 of the shaft 148. The belt is crossed to impart the proper direction of rotation to the reel.

Because of the simplicity of the attachment 102, and and because of the fact that no material alterations need be made in the basic machine, the two can be easily used together or the basic machine can be used alone, thus making the two units quite versatile. That is to say, once the owner acquires the basic machine and the attachment, it is a relatively simple matter to mount and dismount the attachment, depending upon the type of use to which he intends to put the machine. For example, if he finds it more desirable to pick up crops that have been previously harvested and left lying in the field, he can leave the attachment off and the basic machine will function in its conventional manner. Dismounting is accomplished by removing the bolts or cap screws that hold the end attachment means 106 and 107 in place, together with removal of the braces 172 and 173 and disconnection of the belt 184 and removal of the sickle drive shaft 130 from its connection with the wobble member 134. The remaining parts, such as the shafts 136 and 148, may be left on the basic machine, since they will not interfere with its operation.

Remounting of the attachment is also comparatively easy, requiring only the connection of the attachment means, the braces and establishment of the necessary drive components.

Various other specific features of the invention not categorically enumerated herein will undoubtedly occur to those versed in the art, as will various modifications and alterations in the preferred embodiment of the invention illustrated, all of which may be achieved without departing from the spirit and scope of the invention.

What is claimed is:

1. For a harvester having a mobile frame adapted to advance over a field and including at a forward portion thereof conveyor means to which crops are moved upwardly and rearwardly by transverse pick-up means of the type having transversely spaced projecting pick-up fingers movable respectively in transversely alined orbits and drive mechanism therefor: a harvesting attachment comprising a transverse cutting mechanism support having mounting means at its opposite ends, said mounting means extending rearwardly and detachably connected to transversely spaced portions of the harvester to dispose the cutting mechanism support in forwardly spaced relation to the pick-up means and clear of the pick-up fingers and at a level below that of the conveyor means; shield means carried by the cutting mechanism support and directed rearwardly and upwardly therefrom to an upper portion of the pick-up means and serving to close the space afforded by the aforesaid spaced relation of the cutting mechanism support to the pick-up means, said shield being slotted in fore-and-aft planes to enable the pick-up fingers to project therethrough; cutting mechanism carried by the cutting mechanism support to cut crops so that such crops are deposited directly on the shield means to be engaged by the pick-up fingers projecting through the slots in the shield means; and drive means carried by the cutting mechanism support and connected to the cutting mechanism and to the harvester drive mechanism.

2. For a harvester having a mobile frame adapted to advance over a field and including a pair of transversely spaced apart fore-and-aft extending side members and a transverse pick-up means extending across between the side members and supported thereby for operation to pick up crops from the field and to move such crops upwardly and rearwardly to a rearwardly positioned conveyor means: a harvesting attachment comprising a transverse cutting mechanism having opposite end portions and means at said end portions for mounting the cutting mechanism on the harvester side members immediately ahead of the pick-up means to cut crops from the field; and shield means positioned intermediate the cutting mechanism and the pick-up means to receive cut crops from the cutting mechanism directly in front of the pick-up means without permitting such crops to drop to the ground.

3. For a harvester having a mobile frame adapted to advance over a field and including a pair of vertically adjustable, transversely spaced apart fore-and-aft extending side members and a transverse pick-up means of the rotary drum type extending across between the side members and supported thereby for operation to pick up crops from the field and to move such crops upwardly and rearwardly to a rearwardly positioned conveyor means: a harvesting attachment comprising a transverse cutting mechanism having opposite end portions and means at said end portions for mounting the cutting mechanism on the harvester side members immediately ahead of the pickup means to cut crops from the field, each of said means including a bifurcated support element having upper and lower portions rigidly but removably secured to the associated side members respectively above and below the proximate part of the pick-up means for vertical adjustment of the cutting mechanism with the side members.

4. For a harvester having a mobile frame adapted to advance over a field and including a pair of transversely spaced apart fore-and-aft extending side members and a transverse pick-up means of the rotary drum type extending across between the side members and supported thereby for operation to pick up crops from the field and to move such crops upwardly and rearwardly to a rearwardly positioned conveyor means: a harvesting attachment comprising a transverse cutting mechanism having opposite end portions and mounting means at said end portions for mounting said mechanism on the harvester side members immediately ahead of the pick-up means to cut crops from the field, each of said mounting means including a bifurcated support element having upper and lower portions secured to the associated side members respectively, above and below the proximate part of the pick-up means; and shield means positioned intermediate the cutting mechanism and the pick-up means to receive cut crops from the cutting mechanism directly in front of the pick-up means without permitting such crops to drop to the ground.

5. The invention defined in claim 4, in which: each support element has its upper portion in the form of a plate serving as a forward extension of the respective side member and thus affording an end shield for the cutting mechanism.

6. For a harvester having a mobile frame adapted to advance over a field and including at a forward portion thereof conveyor means to which crops are moved upwardly and rearwardly by transverse pick-up means of the type having transversely spaced projecting pick-up fingers movable respectively in transversely alined orbits and drive mechanism therefor: a harvesting attachment comprising a transverse cutting mechanism support having mounting means at its opposite ends, said mounting means extending rearwardly and detachably connected to transversely spaced portions of the harvester to dispose the cutting mechanism support in forwardly spaced relation to the pick-up means and clear of the pick-up fingers and at a level below that of the conveyor means; shield means carried by the cutting mechanism support and directed rearwardly and upwardly therefrom to an upper portion of the pick-up means and serving to close the space afforded by the aforesaid spaced relation of the cutting mechanism support to the pick-up means, said shield being slotted in fore-and-aft planes to enable the pick-up fingers to project therethrough; cutting mechanism carried by the cutting mechanism support to cut crops so that such crops are deposited directly on the shield means to be engaged by the pick-up fingers projecting through the slots in the shield means; drive means carried by the cutting mechanism support and connected to the cutting mechanism and to the harvester drive mechanism; support means at each end of the cutting mechanism; a crop-engaging reel journaled in the support means and driven by the harvester drive mechanism for rotation downwardly and rearwardly over the cutting mechanism support and upwardly and rearwardly over the shield means to facilitate transfer of cut crops from the cutting mechanism and shield means to the conveyor means via the pick-up means, said reel including transversely spaced crop-engaging fingers movable respectively in transversely alined orbits overlapping the orbits of the pick-up fingers, said reel fingers being staggered transversely relative to the pick-up fingers so that said reel fingers operate in interfitting relationship with the pick-up fingers.

7. The invention defined in claim 6, including: means connected to and for driving the reel so that the peripheral speed of the reel fingers is less than that of the pick-up fingers, whereby the pick-up fingers operate to strip crops from the reel fingers.

References Cited in the file of this patent

UNITED STATES PATENTS

| 2,048,940 | MacGregor | July 28, 1936 |
| 2,240,066 | Bingham | Apr. 29, 1941 |
| 2,477,389 | Oehler et al. | July 26, 1949 |
| 2,507,742 | Tuft | May 16, 1950 |
| 2,630,664 | Hansen | Mar. 10, 1953 |
| 2,664,684 | Russell | Jan. 5, 1954 |